United States Patent [19]
Marion

[11] 3,865,665
[45] Feb. 11, 1975

[54] METHOD OF PRODUCING MULTI-LAYER FLAT FILM
[76] Inventor: George J. Marion, 691 E. Boot Rd., Chester, Pa.
[22] Filed: Dec. 10, 1973
[21] Appl. No.: 423,470

Related U.S. Application Data
[63] Continuation of Ser. No. 223,435, Feb. 4, 1972, abandoned, which is a continuation-in-part of Ser. No. 861,047, Sept. 25, 1969, abandoned, and a continuation-in-part of Ser. No. 223,436, Feb. 4, 1972, Pat. No. 3,797,987.

[52] U.S. Cl.................. 156/244, 425/131, 425/462
[51] Int. Cl............................................... B29f 3/00
[58] Field of Search.................. 156/244, 500, 554; 425/109, 131, 462, 466

[56] References Cited
UNITED STATES PATENTS
2,096,362   10/1937   Lehman.............................. 425/462
3,339,234   9/1967    Utz..................................... 156/244
FOREIGN PATENTS OR APPLICATIONS
699,406   12/1964   Canada.............................. 156/244

Primary Examiner—Charles E. Van Horn
Assistant Examiner—Caleb Weston
Attorney, Agent, or Firm—Jackson, Jackson & Chovanes

[57] ABSTRACT

A method of producing a multi-layer flat film which is self-supporting and/or adhering to a substrate by co-extruding at least two thermo-extrudable materials in the form of flat streams or non-solidified sheets in spaced parallel relatively closely adjacent overlapping positions so that their respective side edges are offset or staggered from each other, bonding adjacent face surfaces of such nonsolidified sheets with one another and/or to a substrate and cooling the bonded sheets to form the desired multi-layer composite film. In a preferred embodiment, a wide temperature differential between the co-extruded streams is attained and ranges from about 0° to 200°F. for improved bonding characteristics.

12 Claims, 17 Drawing Figures

METHOD OF PRODUCING MULTI-LAYER FLAT FILM

CROSS-REFERENCE TO RELATED APPLICATION

This application is a continuation of application Serial No. 223,435, filed Feb. 4, 1972 now abandoned for METHOD OF PRODUCING MULTI-LAYER FLAT FILM, which in turn is a continuation-in-part of application Ser. No. 861,047, filed Sept. 25, 1969, now abandoned incorporated by reference herein. This present application is also a continuation-in-part of copending application Ser. No. 223,436, filed Feb. 4, 1972 for COEXTRUSION APPARATUS FOR FLAT FILM, which latter application has since been issued as U.S. Pat. No. 3,797,987, issued on Mar. 19, 1974.

BACKGROUND OF THE INVENTION

1. Field of the Invention

The invention relates to methods of producing flat films and more particularly to methods of producing multi-layer flat films.

2. Prior Art

Methods of producing multi-layer flat film are known. Certain of such methods comprise coating a solid sheet of one material with an adhesive and then laminating another solid sheet of material thereto. Such methods are time-consuming, uneconomical and do not always produce tightly adhered layers. Other methods comprise extruding a molten sheet onto a substrate and then cooling the molten sheet on the substrate. Such methods fail to provide a multi-layer on the substrate, except by a plurality of extrusion steps which are time-consuming and uneconomical. Further, a single layer on a substrate does not provide complete protection to the substrate since pin holes and other imperfections are generally always present in single layers or sheets. Also, such single extrusion methods product an edge buildup of the extruded material on the substrate which is highly undesirable.

Yet other methods comprise extruding a multi-layer tubular blown film that utilizes air pressure or the like to bond the layers to each other. Such methods are not suitable for coating multi-layers of material onto a substrate and generally each material of a multi-layer blown film is extruded at substantially identical temperatures, detracting from an efficient utilization of energy, detracting from improved adherence between such layers and detracting from the use of a wide range of thermo-extrudable materials.

SUMMARY OF THE INVENTION

The invention provides a method of producing multi-layer flat films that overcome and/or substantially eliminate the aforesaid prior art drawbacks.

The invention produces multi-layer flat films of an extremely wide range of thermo-extrudable materials which are self-supporting and/or adhering to a desired substrate. Select thermo-extrudable materials, such as synthetic or natural thermoplastic materials, waxes, hotmelt materials, etc. are co-extruded as parallel, relatively closely adjacent non-solidified sheets having overlapping surface portions with their respective side edges offset from one another. Each thermo-extrudable material is extruded at a selected temperature and a temperature differential ranging from about 0° to 200° F. is provided between each of the extruded materials. The differential heating of the co-extruded materials allows, for example, the layer directly contacting a substrate to be heated to a higher temperature than the outer layer so that better bonding between the substrate and layers occurs at a lower overall heat level and at less deterioration to the formed structure. Similarly, thermo-extrudable materials having widely different rheology characteristics are readily co-extruded and bonded to one another with minimum energy expenditures.

BRIEF DESCRIPTION OF THE DRAWINGS

An understanding of further particulars of the invention may be obtained from a consideration of the following detailed description of representative embodiments thereof, taken in conjunction with the accompanying Figures in the drawings, in which.

DESCRIPTION OF THE PREFERRED EMBODIMENTS

The invention provides methods of producing flat multi-layer film by co-extruding film-forming materials as molten sheets and bonding such sheets to one another and/or to a substrate so that a self-supporting film and/or coated substrate is achieved wherein precise temperature and thickness control for each extruded layer is achieved and edge build-up is substantially eliminated.

Co-extrusion is defined herein as a single extrusion process that combines two or more thermo-extrudable materials, such as thermoplastic resins, waxes, hotmelt, adhesives, etc. in a molten state into a composite film which is self-supporting and/or comprises a multi-layer coating onto a substrate. The method embodiment of the invention includes co-extruding at least two thermo-extrudable materials in the form of flat streams or nonsolidified, molten sheets in spaced-apart parallel relatively closely adjacent overlapping positions so that their respective side edges are offset from each other. The molten sheets are then bonded to each other and/or to a substrate and cooled to form a multi-layer composite film.

In certain embodiments, the substrate is pre-treated, as by heat, corona discharge, etc. for improved bonding with the materials being coated thereon. In other embodiments, each of the co-extruded sheets are heated to an individually controlled temperature and a temperature differential between each molten sheet ranges from about 0° to 200° F. allowing a wide variety of thermo-extrudable material to be used with a minimum overall energy requirement and providing improved bonding characteristics between such molten sheets and/or substrate. The offset side edges of each molten sheet substantially eliminates edge build-up on the formed multi-layer composite sheet so that extrusion trim is unnecessary.

The molten sheets are bonded to one another by being brought into face to face contact while in a molten condition with or without the application of pressure to urge contiguous faces thereof into more intimate relation. The bonded multi-layer film is cooled by passing over the cooling means, such as chill rolls, water baths, etc.

Figure 3:
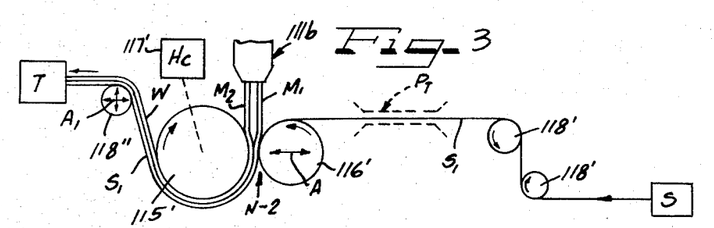
FIG. 3 is an elevational diagrammatic view illustrating a means of practicing the principles of the invention in bonding co-extruded layers onto a substrate.

A wide variety of thermo-extrudable materials can be co-extruded in accordance with the principles of the invention. Thermoplastic resins of diverse melt indexes and/or melt rheology are readily co-extrudable in accordance with the invention and include, for example; acrylonitrile butadiene-styrene copolymers, acetyl homopolymers and copolymers, acrylic polymers, cellulistic polymers, ethyl acylic ester polymers, ethyl vinyl acetate polymers, fluoroplastic polymers, ionomer polymers, methyl pentane polymers, polyamide (nylon) polymers, phenoxy polymers, polyallomer copolymers, polycarbonate polymers, polyethylene polymers, polyester polymers, polyimide polymers, phenylene oxide polymers, polypropylene polymers, polystyrene polymers, polysulfono polymers, polyvinyl chloride polymers, polyvinylene chloride polymers, polyurethane polymers, etc. These may be extruded at different temperatures, say with a temperature differential between the streams of up to about 200° F., for example, wherein stream $M_1$ is at a higher given temperature than stream $M_2$. In this manner, stream $M_1$ is at a sufficiently high temperature for improved bonding with the substrate while stream $M_2$ is molten for bonding with stream $M_1$ but at a sufficiently lower temperature to avoid deterioration and/or vaporization or odor problems. The formed composite structure of the substrate $S_1$ coated with a multi-layer web W is then guided over a guide roll 118″ provided with a four-way adjustment means A′ for selective tensioning of the composite structure. The composite web structure is then guided to suitable take-up station T for processing, storage or use as desired.

Figure 4:
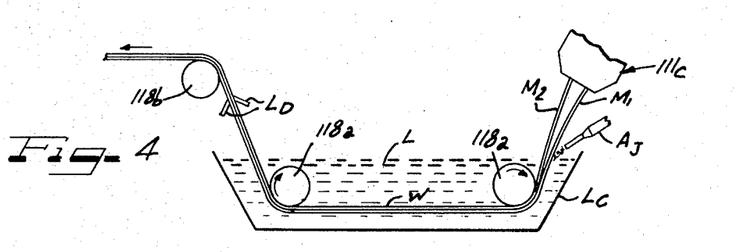
FIG. 4 is an elevational diagrammatic view of a further means of practicing the principles of the invention in producing a self-supporting composite film.

FIG. 4 illustrates a modified form of a bonding setup for use in the practice of the invention. A die means 111c is pivotally mounted so as to be capable of extruding at an angle to the vertical as shown, or pivoted to extrude along a vertical plane as desired. The die means 111c extrudes a pair of closely adjacent melt streams $M_1$ and $M_2$ downwardly into a liquid bath $L_C$ having a cooling liquid L therein. An air jet $A_J$ is mounted adjacent the liquid bath so as to impinge air on the outer surface of melt stream $M_1$ and force it into intimate contact with the melt stream $M_2$ prior to the liquid bath. Suitable guide rolls 118a guide the composite web through the liquid bath for a distance sufficient to solidify the individual melt and form a solidified composite web structure. Another guide roll 118b guides the composite solidified web W upwardly out of the liquid bath and past a pair of wiper means $L_D$, such as conventional doctor blades, for removing any adhering liquid from the composite web W and to a further station, such as a tempering oven, a take-up means or the like. The liquid L may comprise cooled water or some other heat exchange media and may include chemicals therein, for example, for sensitizing the composite surface for reception of printing ink or the like.

Figure 1:
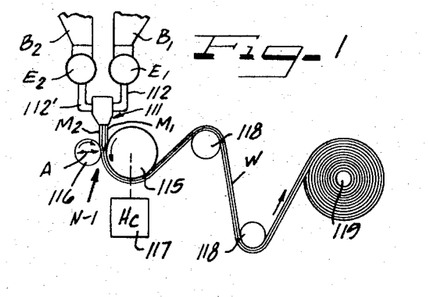
FIG. 1 is an elevational diagrammatic view illustrating a means for practicing the principles of the invention in producing a self-supporting composite film.
Figure 5:
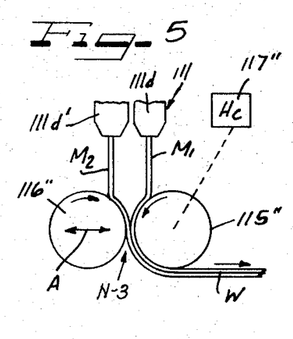
FIG. 5 is an elevational diagrammatic view illustrating yet a further means of practicing the principles of the invention in producing a self-supporting composite film.

FIG. 5 illustrates a somewhat modified form of a bonding setup along the lines of the setup illustrated in FIG. 1. A notable difference is that the die means 111 is comprised of two individual dies 111d and 111d′ which co-extrude melts in the form of flat non-solidified sheets $M_1$ and $M_2$ in spaced-apart parallel, relatively closely adjacent overlapping position to each other with each of said sheets having its respective side edges offset from adjacent sheet side edges so as to avoid edge build-up. Each of the dies 111d and 111d′ produce an individually heated melt stream with any desired degree of temperature differential between the two melt streams, such that for example, the temperature of each of the non-solidified sheets is different from the temperature of the adjacent sheet by about 0° to 200° F. In this manner, extremely efficient use of energy is provided and greatly improved bonding characteristics result. Further, a wide variety of thermo-extrudable materials are usable in providing desired characteristics to a multi-layer composite structure.

Figure 6:
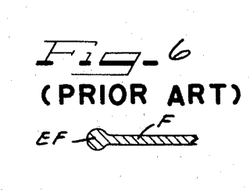
FIG. 6 is a partial cross sectional view of edge buildup at one side of an extruded film formed by prior art.
Figure 7:
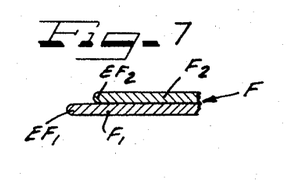
FIG. 7 is a view somewhat similar to FIG. 5 but illustrating a partial cross sectional view of an edge of solidified film layers formed in accordance with the principles of the invention.

As indicated hereinbefore, edge bead and/or edge build-up is one of the most serious problems encountered in the extrusion of flat films or sheets and generally comprises the non-uniform thickness of the extruded sheets throughout the widths thereof, particularly at the edges thereof. The thickness of the edge bead can be 300 to 500 percent greater than the caliber or thickness of the sheet at its center portion. FIG. 6 and 7 illustrate a partial cross sectional view of edge beads as produced in accordance with the prior art and in accordance with the principles of the instant invention, respectively. Such variation in sheet caliber is highly undesirable and edge beads are generally trimmed at the extruder and discarded as waste, because generally two or more melt materials are intermixed within such a bead and there is no convenient means of separating such materials from each other for recycling. Of course, when such extruded sheets are coated onto a substrate, the edge portions of the substrate must also be trimmed and discarded. This is extremely uneconomical. Causes of edge build-up vary with various thermo-extrudable materials, melt temperatures, viscosity or melt indexes, densities, surface tension effects, etc. Since substantial economical advantages would result from the elimination and/or reduction of edge buildup, various attempts to eliminate edge beads have been made, generally without success. The combination of improved heat distribution and regulation of each of the melt streams in the extrusion process and the offset relationship of the side edges thereof provided in accordance with the principles of the invention substantially eliminates, or in certain instances reduces by a factor of about 50 percent, edge beads otherwise present on extruded flat films.

FIG. 6 shows one side edge of a solidified film F having an edge bead EF formed by prior art flat film dies. As can be seen, the edge bead EF is substantially thicker than the other film portions and must be trimmed at the extruder so that a uniform caliber of film can be obtained for further processing.

FIG. 7 illustrates one side of a composite multi-layer film F formed in accordance with the invention and comprised of a film $F_1$ and a film $F_2$, each formed of melt streams $M_1$ and $M_2$ respectively. It will be resins can include foaming agents, coloring additions, antifriction additives, etc. Further, certain of the resins may be in expanded form, as foamed resins. Other thermo-extrudable materials co-extrudable in accordance with the principles of the invention include, for example, natural and synthetic resins, paraffins, hotmelts, adhesives, coloring agents and other similar thermo-extrudable materials.

A wide variety of substrate materials can be coated with multilayer thermo-extrudable materials in accordance with the principles of the invention. The substrate is selected from a wide variety of materials and include various types and grades of paper, metal foils, plastic foils, fabrics, cloth, leather and other various synthetic, natural and/or man-made materials.

In its method embodiments, the invention generally comprises coextruding at least two separate melts in the form of molten flat streams or sheets in spaced-apart, parallel relatively closely adjacent overlapping positions so that their respective side edges are offset or staggered from each other, contacting and bonding such separate molten sheets to one another and/or to a substrate and cooling the bonded sheets into a multilayer composite film. The co-extruded melts may be of the same thermo-extrudable material or of different thermo-extrudable materials. The offset arrangement of the end edges of the co-extruded streams substantially reduces or eliminates edge build-up in the solidified composite film so that substantially no trimming at the extruder is required. Bonding of the molten sheets to each other or to a substrate occurs by contact between the materials to be bonded, with or without pressure urging such materials closer together. Co-extrusion of two layers wherein the layers are combined after extrusion and while in a molten state substantially eliminates all pin holes from the composite film for improved physical and chemical properties therein.

Referring to the embodiments illustrated at FIG. 1, it will be noted that the invention is practiced with a relatively simple extrusion setup. A pair of supply bins $B_1$ and $B_2$ are filled with a desired thermo-extrudable material. Each of the supply bins $B_1$ and $B_2$ may contain the same thermoextrudable material or different thermo-extrudable materials as desired. The supply bins $B_1$ and $B_2$ are operationally connected to separate extruder means $E_1$ and $E_2$, respectively, for conversion of the thermo-extrudable materials in each of the bins to melts thereof. Of course, where the same material is to be co-extruded, only one supply bin and extruder is necessary. A co-extrusion die means 111 is operationally connected to each of the extruder means $E_1$ and $E_2$ by flexible coupling adapters 112 and 112'. The coextrusion die means 111 is preferably one of the constructions discussed in my aforementioned copending application as shown generally in FIGS. 8-17 to be discussed hereinafter, however, other die means capable of producing at least two closely adjacent melt streams may also be utilized.

The die means 111 extrudes two thermo-extrudable materials in the form of flat streams or non-solidified molten sheets $M_1$ and $M_2$, respectively, in spaced-apart, parallel, relatively closely adjacent overlapping positions so that their respective side edges are offset from each other. A pair of rolls 115 and 116 are positioned a relatively short distance below the die means 111 and relatively close to one another so as to define a bonding nip N-1 therebetween. Roll 115 is provided with a heat control means 117 that maintains the surface of the roll 115 at a temperature suitably below the temperature of the melt stream $M_1$ so that upon contact therewith, the melt stream solidifies. In certain embodiments the heat control means 117 comprises a water heat-exchange means $H_C$ wherein cool water or the like is circulated through the interior of roll 115 so as to maintain its peripheral surface at a desired temperature. A roll having such heat control means is generally composed of metal and is referred to as a chill roll. Roll 116 is provided with a conventional adjustment means A for selectively moving toward and from roll 115 for the application of bonding pressure therebetween and is generally a rubber-covered roll. The rolls 115 and 116 are conventionally mounted for rotation toward one another as shown, and are so positioned below die means 111 that melt stream $M_1$ contacts the down-running surface of roll 115 while melt stream $M_2$ contacts the down-running surface of roll 116. As the melt streams $M_1$ and $M_2$ travel with their respective roll surfaces toward nip N-1, they contact one another and bond to each other to form a composite multi-layer structure or web W. Since only one of the rolls, i.e. roll 115, is cooled, melt stream $M_1$ solidifies first on the surface thereof in contact with such roll while the other surface thereof remains somewhat molten for improved bonding with the other melt stream $M_2$. After initial contact of the melt streams to one another, as at the nip N-1, they form a composite partially molten web structure that wraps roll 115 for a substantial portion of its periphery whereby the entire composite structure is solidified into a composite web W. A plurality of guide rolls 118 are positioned downstream of the nip N-1 so as to define a somewhat serpentine-like path of web travel through air to a take-up roll 119. The take-up roll 119 winds the web W onto a suitable core so as to form a supply roll of a desired diameter composed of the multi-layer composite web W for storage or use as desired. In certain embodiments, the guide rolls 118 are provided with adjustment means, such as A on roll 116, to selectively vary their respective positions and thereby stretch or orientate the formed composite web W. Further, if desired, surface treatment means (not shown) may be positioned prior to take-up roll 119 to render a given surface of the web W more susceptible to printing, etc. Such surface treatment means may comprise means producing a corona discharge onto the treated surface, heating means or other similar means utilized in the art for treating the surface of a composite web.

It will be noted that there is no trim means at the extruder since the offset side edges of the streams eliminate edge build-up so that a smooth supply roll of the composite web can be produced without having wrinkles or other irregularities along its peripheral surfaces. As will be appreciated, in prior art, edge build-up in multi-layer composite films prevents the formation of smooth supply rolls of such a composite film and the edge build-up must be trimmed away before supply rolls are produced.

Figure 2:
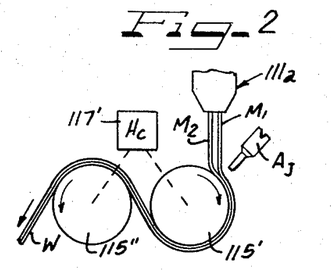
FIG. 2 is an elevational diagrammatic view illustrating another means for practicing the principles of the invention in producing a self-supporting composite film.

Referring now to the embodiment illustrated at FIG. 2, a die means 111a co-extrudes two closely adjacent but spaced-apart molten melt streams $M_1$ and $M_2$ that have their respective side edges offset from one another so as to avoid edge build-up. A pair of chill rolls 115' and 115'' are positioned in a spaced-apart side-by-side relation below and to one side of die means 111a. As the melt streams $M_1$ and $M_2$ travel downwardly, they pass an air jet means $A_J$ aimed to impinge pressurized air or the like onto the periphery of roll 115'. Air jet $A_J$ forces the two molten streams $M_1$ and $M_2$ into contact with each other just as they are approaching the downward running surface of roll 115. As shown, the outer surface of melt stream $M_2$ comes in direct contact with the cooled surface of roll 115' while the inner surface of melt stream $M_1$ bonds to the inner surface of melt stream $M_2$. The so-formed partially molten composite structure wraps roll 115' for a distance sufficient to substantially solidify at least a portion of melt stream $M_2$. This composite structure is then trained to pass to the other chill roll 115'' so that the opposite surface of the composite, i.e., the outer surface of melt stream $M_1$ contacts the cool surface of roll 115'' and solidifies at least a portion of the same. The contiguous surfaces between melt streams $M_1$ and $M_2$ form a tightly adhering bond because such surfaces remain at least partially molten over a considerable time and distance allowing excellent bonding to occur. Further, bonding of such two molten melt streams substantially eliminates all pin holes from the composite web structure. The solidified web W is then guided to a suitable take-up station or the like as desired.

The embodiment at FIG. 3 illustrates an extrusion-coating setup suitable for practice of another embodiment of the invention. A suitable substrate supply S feeds a substrate $S_1$ over a plurality of guide rolls 118' and past an optional pre-treatment means $P_T$ for rendering the substrate more receptive to bonding with molten thermo-extrudable materials. An exemplary form of a pre-treatment means comprises a pair of opposing electrodes positioned on either side of the traveling substrate and operationally connected to a suitable high-frequency alternating electrical potential so that a corona discharge is produced therebetween and impinges upon the surfaces of the substrate. Another exemplary form of a pre-treatment means comprises a radiant heat means or oven that heats the passing substrate to a desired temperature. As indicated earlier, the substrate is selected from a wide variety of materials and includes, for example, various types and grades of papers, metal foils, plastic films, fabrics, cloth, leather and various other substrate materials.

Substrate $S_1$ is then guided over a rubber-covered roll 116' having an adjustment means A for selective movement in the direction indicated by the double-headed arrow. The die means 111b is positioned above roll 116' so that one of the melt streams $M_1$ extruded therefrom intersects the downrunning surface of roll 116' and contacts the upfacing surface of substrate $S_1$. The other melt stream $M_2$ is extruded in a closely adjacent but spaced apart parallel relation from stream $M_1$ and contacts the downrunning surface of chill roll 115', which is positioned along a parallel horizontal axes with roll 116 and in relatively close-running relation thereto so as to define a bonding nip N-2 therebetween. As the rolls 115' and 116' rotate toward one another, the molten melt streams $M_1$ and $M_2$ are brought into contact with each other under pressure so that a composite web structure forms. It will be noted that the melt stream directly bonded to the substrate does not come into direct contact with a cooling surface, i.e., chill roll 115', so as to remain in an essentially molten state for a period of time during its travel over rolls 116' and 115' and thereby obtain improved bonding between melt stream $M_1$ and substrate $S_1$. Melt stream $M_2$ is chilled or cooled along its outer surface while its inner surface remains relatively molten for bonding with the inner surface of stream $M_1$. Of course, melt streams $M_1$ and $M_2$ noted that the end edges $EF_1$ and $EF_2$ of each respective film have almost no visible bead so that extruder trimming is substantially eliminated and the solified film may be wound on a supply roll thereof for further process as is and without any further trimming steps. Such a supply roll is characterized by being substantially flat and without wrinkles across its entire width.

As will be appreciated, there are two types of trim in producing commercial flat films. First, there is a trim at or on the extruder itself to eliminate edge beads and associated irregularities. With an average 60 inch film width, the extruder trim is approximately one inch on each side or about 3.5 percent trim. With co-extrusion processes producing a multi-layer film having each layer composed of a different thermo-extrudable material, this trim is pure waste that cannot be recycled. However, in an extrusion process in accordance with the principles of the invention, this waste is substantially eliminated and corresponding economic advantages are realized. The second trim occurs downstream of the extruder and comprises approximately one-half inch trim on each side of the film.

Apparatus embodiments useful in co-extruding at least two thermoextrudable materials in the form of flat non-solidified sheets in spaced-apart parallel relatively closely adjacent overlapping positions to each other, with each of the sheets having its respective side edges offset from adjacent side edges and each sheet being at an independent temperature, with a temperature differential between the temperature of each sheet being in the range of about 0° to 200° F. is illustrated at FIGS. 8–17. In each of the Figures, like elements are referred to by like numerals in a higher numerical sequence. For example, the elements in FIG. 1 are numbered 11 through 21 consecutively, in FIG. 2 like elements are numbered 211 through 221, in FIG. 4 like elements are numbered 411 through 421, etc. Details of such apparatus embodiments are set forth in my copending application filed concurrently herewith (presently identified as attorneys Case No. 71,658), which is incorporated herein by reference. Generally, the embodiment illustrated at FIG. 8 comprises a die body 111 that includes a first body portion 11a and a second portion 11b, which are assembled into a single body formed of two mirror-image portions. Such mirror-image portions are economically manufactured and reduce the overall cost of the die body 111. Of course, if desired, the die body 111 may be formed of a single monolithic body. The body portions 11a and 11b are rigidly held in assembly by bolt means, and an exemplary horizontal bolt 13 and an exemplary vertical bolt 13a are shown.

Figure 8:
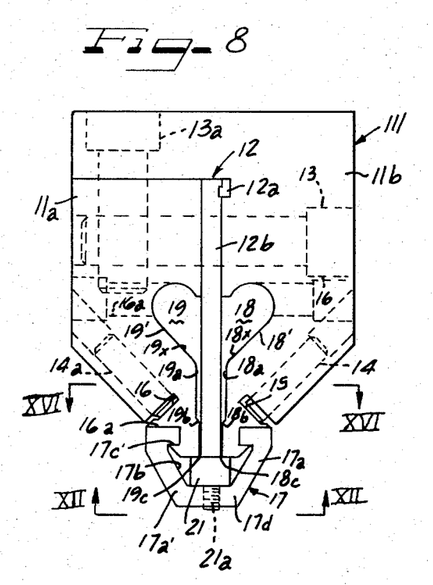
FIG. 8 is an elevational diagrammatic view of an embodiment of a preferred apparatus for practicing the principles of the invention.

A centerplate member 12 is positioned between the body portions 11a and 11b and is an essentially rectangular shape for ease of machining. A key-like member 12a locks the plate 12 along its upper portions with an appropriately shaped groove or the like in body portion 11b. Other means of securing the plate to the body portions can also be utilized, for example, the plate may be L-shaped for clamping between the body portions or bolts or the like may be utilized to secure the plate to one of the body portions. The centerplate member 12 is composed of a heat-resistant material 12b, preferably of metal, such as stainless steel, aluminum, an alloy, etc. and the side surfaces thereof are smooth and highly polished.

Figure 11:
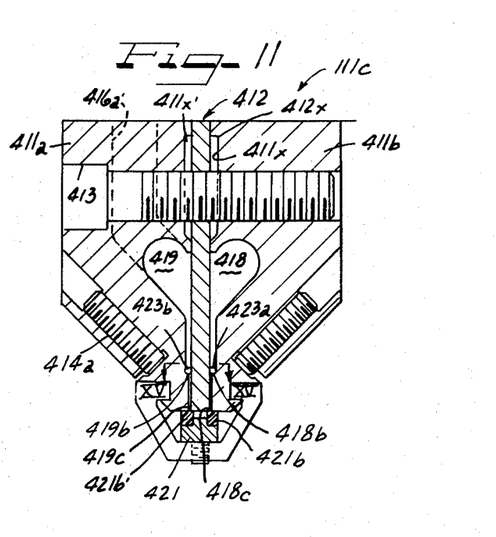
FIG. 11 is an elevational sectional view of yet another embodiment of an apparatus useful in the practice of the invention.

Melt inlet passages 16 and 16a, respectively, are provided in each of the body portions 11b and 11a. The embodiment illustrated at FIG. 1 shows the inlet passages 16 and 16a as being adapted for center feed operation. If desired, melt inlet passages can be adopted for end and/or top feed operation. Extruder conduits or connecting adapters 112 and 112' respectively (best seen at FIG. 1) interconnect inlet passages 16 and 16a with at least one extruder providing a thermoextrudable material and preferably with a plurality of extruders providing a different melt to each inlet passage. The die body 111 can be connected to extruder by means of machined rigid connecting adapters or by flexible coupling adapters formed of standard hydraulic stainless steel tubing, such as capable of withstanding pressures of about 10,000 psi. While the inlet passages 16 and 16a are illustrated as being horizontally orientated, angular and vertical orientation, such as illustrated at FIG. 11 may also be utilized.

Manifold chambers 18 and 19, respectively, are disposed within each of the body portions 11b and 11a so that the inner boundary of each of the chambers is contiguous with a side surface of the centerplate member 12. The manifold chambers 18 and 19 are somewhat streamlined and tapered downwardly toward the side surfaces of the centerplate 12. The boundaries of the chambers 18 and 19 extend into the body portions 11b and 11a respectively and are somewhat tear-shaped for improved flow characteristics of melts therein and for improved heat distribution. Each of the manifold chamber outer walls 18' and 19' taper toward points 18x and 19x respectively, directing the melt flows within each of the chambers toward the centerplate 12. Pre-land surfaces 19a and 18a join the outer walls 18' and 19' of each chamber at point 18x and 19x respectively. The pre-land surfaces 18a and 19a cooperate with opposite side surfaces of the centerplate 12 to define first relatively narrow melt flow passages for coarse throttling or control of each melt stream. Final land surfaces 18b and 19b respectively, join the pre-land surfaces 18a and 19a and in cooperation with the side surfaces of centerplate 12 define second relatively narrower melt flow passages for fine throttling or control of each melt stream. The final land surfaces 18b and 19b terminate at the bottom of die body 111 and in cooperation with the terminal end of the centerplate 12 define at least a pair of side-by-side outlet slots 18c and 19c respectively. The outlet slots 18c and 19c are spaced apart but relatively close to one another so that the extruded melt sheets may be readily bonded to one another or to a substrate while still in their molten state. The manifold chambers 18 and 19, the pre-land surfaces 18a and 19a, the final land surfaces 18b and 19b and the outlet slots 18c and 19c extend substantially along the entire length of the die body 111 and are closed from ambient environment along their ends by a pair of end plates (not shown).

A pair of relatively deep narrow grooves 15 and 16 are provided along the respective outer walls of the die body portions 11b and 11a. The grooves 15 and 16 extend inwardly along each body portion for a given distance at approximately a 45° angle to the centerplate. This configuration of the grooves 15 and 16 toward the pre-land surfaces 18a and 19a respectively, allows the body portions below the grooves to move in respect to the body portions above the grooves. Since the upper and lower body portions are formed from a unitary piece of material, inherent strength and flexibility of such portions is assured. Certain prior art arrangements include movable lips on a die body that are composed of a plurality of separate pieces and thus lack inherent strength and flexibility of a unitary body.

Figure 17:
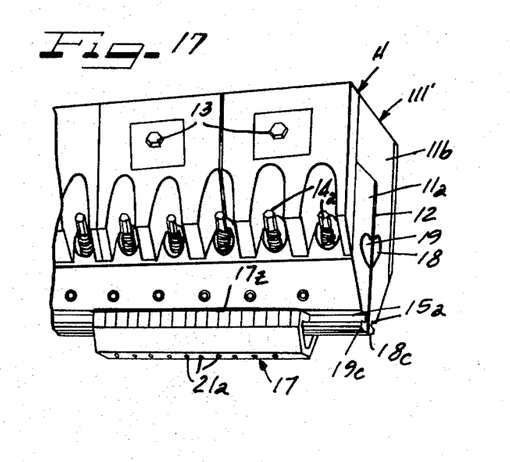
FIG. 17 is a partial perspective view of an embodiment of apparatus useful in the practice of the invention.

Adjustable thimble bolts 14 and 14a are positioned within the body portions above the grooves 15 and 16 so as to have their inner ends abut against the lower groove walls for selectively moving the body portions below such grooves toward and away from one another and thereby adjust the width and profile of the outlet slots 18c and 19c respectively. As best seen in FIG. 17, the thimble bolts 14, 14a are in an opposing alternatingly staggered relation to each other along the length of the die body. This arrangement is contrary to conventional die lip adjustment means and eliminates hills and/or valleys in each of the extruded layers so that a substantially uniform caliber along the entire width of each of the extruded sheets is produced.

A pair of relatively shallow grooves 15a and 16a respectively, are provided along the respective outer walls of body portions 11b and 11a and positioned below the grooves 15 and 16 but above the outlet slots 18c and 19c. The grooves 15a and 16a extend inwardly substantially perpendicularly to the final land surfaces 18b and 19b and accommodate an external deckle bar carrier member 17. While only one deckle bar carrier member is shown, a plurality of similar members can be provided along the length of the die body, and in certain preferred embodiments at least a pair of such carrier members are utilized, one at each end of the die body. Since the carrier members are all essentially identical in construction, only one carrier member 17 will be described in detail.

The deckle bar carrier member 17 is generally referred to as a "boat" deckle and is preferably formed from a single piece of relatively strong heat-resistant material, such as metal. The boat deckle or carrier member 17 includes a pair of upwardly extending arms 17a and 17a', respectively, which terminate in inwardly turned ends 17c and 17c', respectively, to be slidably received in grooves 15a and 16a, respectively. Means for selectively moving the deckle boat along the length of the die body are provided and an exemplary embodiment of such means comprises a rack and pinion arrangement that allows the deckle boat to be precisely moved to a desired location and positively locked in place at such location. Other means for moving such deckel boats are also available.

The deckle boat 17 is formed with a somewhat U-shaped recess 17b having a bottom wall 17d opposite the outlet slots 18c and 19c respectively. A deckel bar 21 is formed so as to be received within the recess 17b for limited reciprocal movement toward and away from the outlet slots 18c and 19c. The deckle bar 21 is shown as being a solid body, such as of a suitable heat-resistant metal, however, in other embodiments such as shown in FIG. 11, one or more strips of packing 421b and 421b' are securely positioned on a metal body 421 and biased against the outer surfaces of outlet slots 18c and 19c. Such packing strips are formed of any suitable heat resistant frictionless material, such as asbestos impregnated with graphite or polytetrafluoroethylene.

Means for regulating the pressure or sealing force of deckle bar 21 against the outlet slots 18c and 19c includes a plurality of set screws 21a which are externally threaded through the bottom wall 17d of deckle boat 17. Other means include the use of biasing members between the packing strips and their support bodies.

Means for regulating the heat along each of the melt flow passages throughout the die body are operationally attached to the die body and provide an independent temperature for each melt as desired. Suitable heating means include resistant heaters, such as cast-in aluminum heaters that are comprised of, for example, an electrical heating element cast into an aluminum jacket for attachment to desired positions on the die body. Other heating means include a plurality of flow passageways for circulating a heating media within select portions of a die body. The heating means allow a selective temperature differential to exist between the melt extruded from the respective outlet slots, say of 0° to 200° F. Such heat differential provides improved bonding characteristics between various thermo-extrudable materials and/or between such materials and various substrates.

Figure 9:
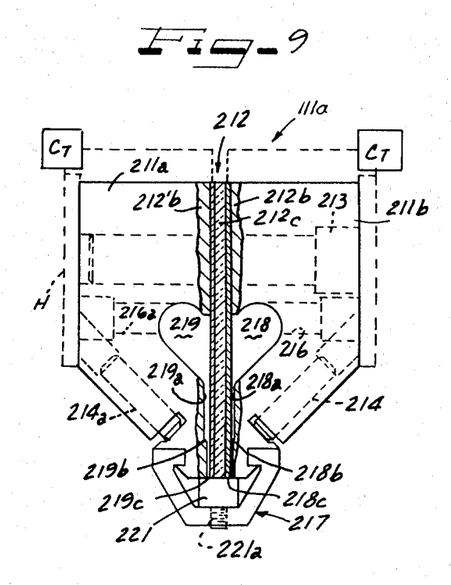
FIG. 9 is an elevational view, partially in section, of another embodiment of apparatus for practicing the principles of the invention.

The embodiment illustrated at FIG. 9 is generally quite similar to the embodiment illustrated at FIG. 8 except that the centerplate member 212 of die body 111a is comprised of a pair of opposing metal plates 212b and 212b' separated by heat-insulating means, such as a sheet of asbestos 212c. The width dimension of centerplate 212 various from embodiment to embodiment but is generally relatively thin, such as about 0.25 to about 1.5 inch. In certain embodiments, the metal plates 212b and 212b' include an embedded heating element (not shown) that is operationally connected to a controllable heat-energy source $C_T$, as shown by the dotted lines. The asbestos sheet 212c prevents any substantial heat transfer across the centerplate member 212. As discussed earlier, other heating means H are also operationally associated with the die body 211a and are operationally connected to an energy source $C_T$. It will be noted that each side of the die body has a separate controllable energy source $C_T$, for example, a rheostat-like control connected to an electrical power source. Heating means H comprises a plurality of separate individual resistance heaters, each connected to a controllable heat-energy source so that different portions of the die body can receive individually selected amounts of heat, such as an increased amount of heat at one or both ends thereof to insure that the melt has the same flow characteristics along the entire length of the die body.

Figure 10:
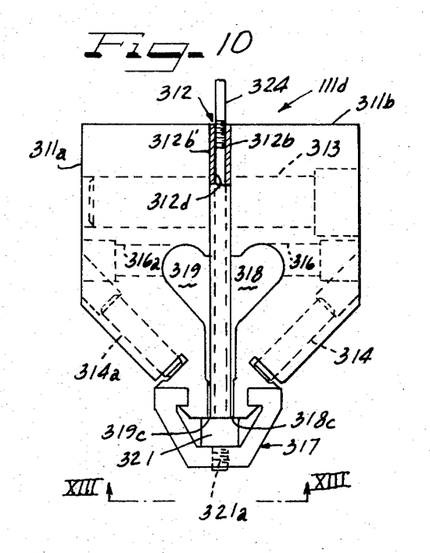
FIG. 10 is an elevational view, partially in section, of yet a further embodiment of an apparatus useful in the practice of the invention.

The embodiment illustrated at FIG. 10 is likewise substantially similar to the embodiment discussed in conjunction with FIG. 8 and a notable difference resides in the centerplate 312. The centerplate member 312 is comprised of a pair of opposing solid metal portions 312b and 312b', having one or more openings 312d therebetween which extends from the top to the bottom of the die body 30. In certain specific forms of this embodiment, such as illustrated at FIG. 5, opening 312d comprises an uninterrupted air space between the metal portions 312b and 312b' and functions to insulate one of the manifold chambers 318 from the other of the manifold chambers 319 so that little, if any, heat transfer takes place between such manifold chambers. Such a construction may be considered to comprise two single slot dies adapted for relatively close positioning to one another so as to feed two melt streams to a single bonding or coating station and such an arrangement of single slot die bodies are within the scope of the instant invention. Preferably a single deckle boat 317 is associated with such a die assembly so that deckle bar 321 selectively blocks portions of each outlet slot 318c and 319c to avoid edge build-up. However, if desired, separate deckle boats and bars may be provided for each die.

Figure 13:
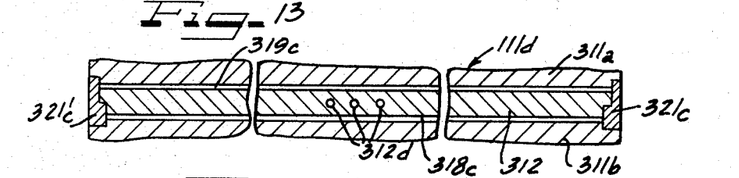
FIG. 13 is a partial fragmentary bottom sectional view taken along the line XIII—XIII of FIG. 10.

In certain other forms of the embodiment illustrated at FIG. 10, one or more gas feed pipes 324 are threaded into a plurality of appropriate sleeves or openings 312d along the length of the centerplate member 312. Generally, an oxidizing gas, such as oxygen, ozone, nitrogen oxides, sulfur oxides, halogens, etc. with or without an inert diluent, such as nitrogen, is provided from a suitable source (not shown) at a controlled rate so as to contact the inner surfaces of the extruded melt sheets and then react with at least one of the such melt sheets to alter its chemical and/or physical properties for improved bonding characteristics between such melt sheets. Additionally, certain monomers, such as styrene, vinyl chloride, butadiene, etc. are vaporizable and provide an excellent gas for improved bonding of certain dissimilar thermo-extrudable materials, such as of nylon and of polyethylene. A corona discharge may be provided in the gas space between the melt sheets immediately below the outlet slots for further improved bonding. Suitable electrodes are operationally attached along the bottom wall of centerplate 312 and connected to a source of high-frequency alternating potential so as to generate a corona discharge that effects at least one surface of the extruded melt sheets. The gas feed-through pipes 324 are distributed along the entire length of the centerplate member 312 or only along select portions thereof, such as along the center portions as best seen in FIG. 13. The oxidizing gas or the like is circulated through the die body and into the space below the outlet slots by being fed into certain of the through pipes and withdrawn from certain of the other through pipes.

If desired, the feed pipes 324 may be suitably interconnected along their bottom portions so that a heating fluid or the like can be circulated throughout the centerplate for maintaining a desired temperature along the respective inner walls of the melt flow passageways within the die body.

The embodiment illustrated at FIG. 11 is likewise generally similar to the embodiment described in conjunction with FIG. 8 or FIG. 9. However, a number of differences exist between the embodiment shown in FIG. 11 and the heretofore discussed embodiments. One such difference resides in the provision of heat sink means 412x for centerplate 412. The heat sink means 412x comprise a pair of opposing sink-cavities 411x and 411x', respectively, each being formed in its respective body portion 411b and 411a. The sink-cavities 411x and 411x' extend substantially the entire length of the die and are positioned slightly above an upper periphery of the manifold chambers 148 and 149 so as to extend upwardly therefrom and terminate some distance below the top of die body 111c. The actual dimension of such sink-cavities varies in accordance with the dimension of a die body and is generally of a sufficient dimension to entrap heat from one side of the centerplate member 412 and prevent any substantial portion thereof from being transferred to the other side thereof. The heat sink means 412x provide a further means of establishing the desired temperature differential between the separate melts in their respective flow passageways throughout the die body.

Another difference is that internal deckle rods 423a and 423b, respectively, are positioned at the juncture of pre-land surfaces 418a, 419a and final land surfaces 418b, 419b and extend inwardly a preselected distance (best seen in FIG. 15) so as to vary the width of each of the flow passages available for their respective melts and thereby produce offset side edges in each of the extruded sheets to reduce and/or eliminate edge build-up in the resulting bonded film. In certain forms of this embodiment, such internal deckle rods are utilized in place of external deckle bars, however, in other forms, such internal deckle rods are utilized in combination with external deckle bars, as shown to provide more concise control of edge build-up. The internal deckle rods 423a and 423b are composed of a heat resistant material, such as of a metal and generally comprise cylindrical bodies terminating in a rounded end. The rods may include shaped side surfaces for varying the cross section of the space between such side surfaces and the final land surfaces for additional control of melt flow along the edges of the layers being extruded. The external deckle means here comprises a deckle boat 417 substantially similar to that described earlier and having a body 421 positioned therein. The body 421' is formed so as to have a pair of grooves along the upper surface thereof substantially in register with the outlet slots 418c and 419c respectively. Packing strips 421b and 421b' are force-fitted within such grooves and biased against portions of the outlet slots so as to seal the same for select offset amounts to avoid edge build-up.

Figure 12:
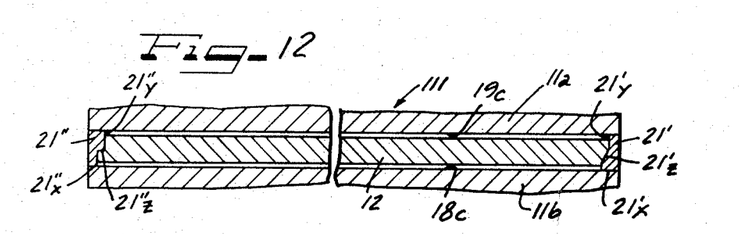
FIG. 12 is a fragmentary partial bottom sectional view taken along the line XII—XII of FIG. 8.

Referring now in further detail to the deckle means utilized to avoid edge build-up in accordance with the principles of the invention, FIG. 12 illustrates certain specific embodiments of deckle bars 21, shown in working relationship with a die body 111 having outlet slots 18c and 19c respectively. in the right hand embodiment, deckle bar 21' is formed so as to have a stepped inner side edge or face comprised of a first step 21'x and a second step 21'y, joined to the first step by gradual or sloping juncture 21'z. The steps 21'x and 21'y seal off different lengths of each outlet slot 18c and 19c so that the extruded sheets have offset widths or side edges. Such deckle bars substantially eliminate edge beads with most thermo-extrudable materials and with others, cause a reduction of edge bead so that when the offset edges of the extruded sheets are bonded together or onto a substrate, the two offset edges cannot combine and the variation in thickness at such edges is very minor and very little, if any, extruder trim is required. In the left hand embodiment, deckle bar 21'' is formed somewhat similarly to deckle bar 21' and has a stepped inner side edge or face comprised of a first step 21''x and a second step 21''y, joined to the first step by a sharp or straight juncture 21''z. Since the steps 21''x and 21''y are offset from each other and are aligned so as to overlap or seal only one of the outlet slots 18c or 19c, respectively, the edges of the sheets extruded therefrom are likewise offset. Deckle bars 21' and 21'' are utilizable on opposite ends of the same die body so that the resultant composite film has opposingly staggered side edges, allowing one side to be trimmed of one material and the other side to be trimmed of another material, whereby both materials can be recycled as desired so that no waste results. Of course, an opposing pair of deckle bars 21' and 21'' may also be utilized on a single die body and only the same material be trimmed from both sides of the resulting composite film.

FIG. 13 illustrates a pair of opposing deckle bars 321c and 321c' positioned in working relation with outlet slots 318c and 319c respectively, of die body 111d. The stepped inner faces of deckle bars 321c and 321c' are so formed that each step only overlaps or seals a single outlet slot whereby staggered sheet end edges are produced. The deckle bars 321c and 321c' are somewhat different from the earlier discussed deckel bar embodiments in that the cross-machine end edges thereof extend beyond the side boundaries of the outlet slots. Such deckle bar construction is more economical since a greater dimension tolerance, at least in the cross-machine direction is permitted. In the arrangement here shown, certerplate 312 has a plurality of gas feed pipes 312d arranged along at least the center portion of the die body for the introduction of an oxidizing gas or the like between the extruded molten sheets.

Figure 14:
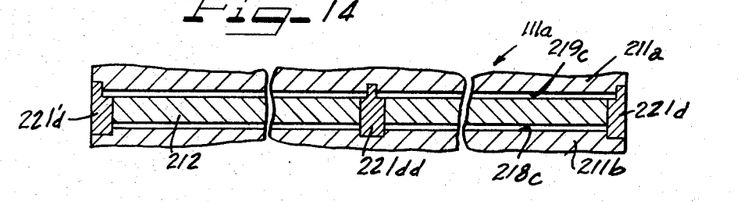
FIG. 14 is a view somewhat similar to FIG. 12 but of a different embodiment of the apparatus useful in the practice of the invention.

FIG. 14 illustrates a plurality of deckle bars 221d, 221d' and 221dd positioned in working relation with outlet slots 18c and 19c of die body 111a. The stepped inner faces of deckle bars 221d and 221d' are essentially similar to that described earlier, but deckle bar 221dd has both of its side edges or faces stepped in the manner earlier described. With a plurality of deckle means, a plurality of multi-layer ribbon-like sheets can be simultaneously extruded whereby one or more of such multi-layer ribbons can be formed into a composite multi-layer film while another multi-layer ribbon is being coated onto a substrate. Of course, the deckle means are provided in various lengths so that a desired sheet width is readily attainable from a single die and any number of deckle means may be utilized to provide a plurality of relatively narrow multi-layer ribbons.

Figure 15:
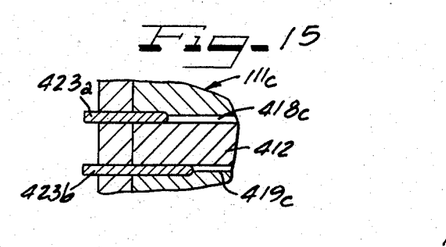
FIG. 15 is a partial fragmentary bottom sectional view taken along line XV—XV of FIG. 11.

FIG. 15 is a partial view of one side of a die body 111c having outlet slots 418c and 419c, respectively, which are partially sealed or blocked at their ends by internal deckle rods 423a and 423b, respectively. The deckle bars 423a and 423b are inserted as a pair from opposing ends of the die body at the approximate juncture of the pre-land surfaces and final land surfaces. Each pair of deckle rods is inserted a preselected distance into the die, in accordance with the material being extruded from that particular outlet so as to provide offset side edges in the extruded sheets substantially as explained hereinbefore. A die body may utilize only internal deckle rods or may utilize a combination of internal and external deckle means for substantial elimination of edge build-up.

Figure 16:
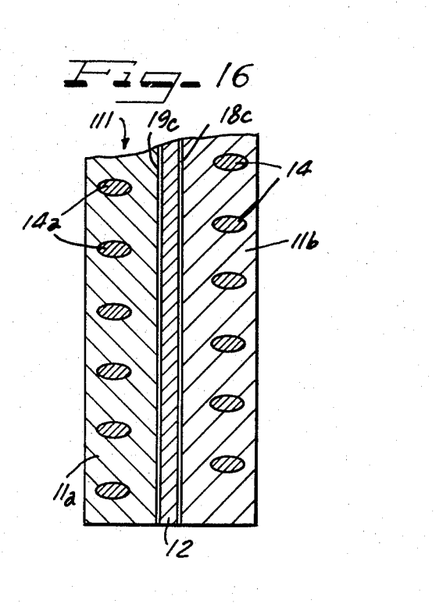
FIG. 16 is a partial sectional view taken along the XVI—XVI of FIG. 8.

FIG. 16 illustrates a portion of a die body 111 comprised of body portions 11a and 11b and centerplate 12 so as to define a pair of closely adjacent outlet slots 18c and 19c wherein thimble bolts 14 and 14a are uniformly staggered on opposite sides of the die body for selective movement of each outer wall of each of the die slots. Thimble bolts 14 and 14a allow precise control of each layer thickness and because of the uniform staggered relation, allow elimination or reduction of hills and valleys in the composite extruded film so that a substantially uniform caliber of film or coating is readily attained along the entire width of the die. The width of each outlet slot is precisely and uniformly adjustable by selective movement of the outer wall thereof so that a uniform gauge thickness can be maintained throughout the width of the film. The guage thickness ranges normally from about 0.1 to 10 or more mils (0.001 to 0.01 inch).

FIG. 17 is a partial perspective view of a die body 111' somewhat similar to that illustrated at FIGS. 8–11, with an end plate removed for the sake of clarity. The die body 111' is somewhat rectangular in configuration, with convergingly sloping bottom walls that terminate in a pair of closely adjacent outlet slots 18c and 19c respectively. A deckle boat 17 is mounted for selective movement along grooves 15a situated above the outlet slots. The deckle boat 17 may be provided with indicia markings along visible surfaces thereof, such as distance indicia so that an operator can readily determine the position of the deckle boat in relation to the die body. The deckle boat 17 includes means for positively moving and securing the same to a given location along the length of the die body, such as means 17z. A plurality of heating plates H are secured along the side portions of the die body and are appropriately connected to an energy source (not shown) so that each heating plate H can be independently regulated to provide a desired amount of heat to its portion of the die body.

The heating means associated with the die body provide precise temperature control for each melt throughout its flow passages within the die. Each of the heting means is independently controllable and substantial temperature differential between adjacent melt sheets is readily attained. This is an important feature of the invention since it allows one melt to be heated to a substantially greater temperature while the other melt is maintained at a relatively lower temperature. This feature not only allows completely different thermo-extrudable materials to be co-extruded but also, during coating operations, allows the melt to be directly bonded to a substrate to be heated to a higher temperature whereby improved bonding is achieved while at the same time minimizing deteriorations and/or odor from the other melt, maintained at a lower temperature.

The deckle means, whether external bars, the internal deckle rods or a combination thereof, are so positioned onto the outlet slots that offset end edges result in the extruded sheets thereby greatly reducing and/or eliminating edge build-up. The amount of offset required between the adjacent end edges of the outlet slots to avoid edge build-up depends upon a relatively large number of complex factors, which may be summarized by stating that the amount of offset depends upon the amount of neck-in occurring for a given thermo-extrudable material at given operating conditions before such material solidifies or reaches a support, such as a substrate. For example, when the thermo-extrudable material forming both melts is polyethylene, the end edges of the outlet slots are deckled so as to be offset from each other about 0.125 to about 0.375 inch (⅛ to ¾ inch) and preferably 0.25 inch. Other thermo-extrudable materials require different offset end edges to avoid edge build-up and the exact amount thereof is readily determined by simple observation during operation. The deckle means of the invention are easily adjustable to provide various amounts of edge offset during operation of the die so that an operator can readily adjust the same as required to substantially eliminate edge build-up during co-extrusion of any given combination of thermo-extrudable materials.

In summation, the invention in at least certain of its embodiments comprises a method of producing a multi-layer flat film by producing at least two separate melts of a given thermo-extrudable material, each of which melts are at a given independent temperature; co-extruding such melts in the form of flat non-solidified sheets in spaced-apart parallel relatively closely adjacent overlapping position to each other so that each sheet has its respective side edges offset from adjacent sheet side edges; bonding adjacent face surfaces of the non-solidified sheets with one another and cooling the bonded sheets to form a solidified multi-layer of composite film. Methods of coating a multi-layer flat film onto a substrate are also set forth as are methods of producing multi-layer ribbons per se or on a substrate.

Modifications, variations and changes from the described preferred exemplary embodiments may be made without departing from the spirit and scope of the novel concepts of the invention.

I claim as my invention:

1. A method of producing a multi-layer flat film comprising;
   co-extruding at least two thermo-extrudable materials in the form of flat non-solidified sheets in spaced-apart relatively closely adjacent overlapping position to each other, each of said sheets having its respective side edges offset from adjacent sheet side edges;
   bonding adjacent face surfaces of such non-solidified sheets with one another; and
   cooling the bonded sheets to form a solidified multi-layer composite film.

2. A method of coating a multi-layer flat film onto a substrate comprising;

co-extruding at least two thermo-extrudable materials in the form of flat non-solidified sheets in spaced-apart relatively closely adjacent overlapping position to each other, each of said sheets having its respective side edges offset from adjacent sheet side edges;

feeding a substrate for continguous contact with one of said nonsolidified sheets;

substantially simultaneously bonding adjacent face surfaces of such non-solidified sheets with one another and bonding one of the other face surfaces of one of said sheets with an adjacent face surface of said substrate; and cooling the bonded sheets to form a solidified multi-layer flat film coating on the substrate.

3. A method of producing a multi-layer flat film as defined in claim 1 wherein each of the co-extruded non solidified sheets is at an independent given temperature.

4. A method of producing a multilayer flat film as defined in claim 3 wherein a temperature differential between the temperatures of each non-solidified sheet ranges from about 0° to about 200° F.

5. A method of producing a multi-layer flat film as defined in claim 1 wherein one side of the bonded non-solidified sheet is cooled prior to the cooling of the other side of such bonded non-solidified sheets.

6. A method of producing a multi-layer flat film as defined in claim 1 wherein the opposite non-bonded face surfaces of said non-solidified sheets are cooled substantially simultaneously.

7. A method of coating a multi-layer flat film onto a substrate as defined in claim 2 wherein at least a face of the substrate is heated prior to contact with one of said non-solidified sheets.

8. A method of coating a multi-layer flat film onto a substrate as defined in claim 2 wherein at least one of the surfaces of the substrate is subjected to a corona discharge prior to contact with one of said non-solidified sheets.

9. A method of coating a multi-layer flat film onto a substrate as defined in claim 2 wherein each of said non-solidified sheets is at an independent temperature.

10. A method of coating a multi-layer flat film onto a substrate as defined in claim 9 wherein a temperature differential between the temperature of each of said non-solidified sheets ranges from about 0° to 200° F.

11. A method of producing a multi-layer flat film comprising:

producing at least two separate melts of a given thermo-extrudable material, each of said melts being at a given independent temperature;

co-extruding said melts in the form of flat non-solidifed sheets in spaced-apart relatively closely adjacent overlapping position to each other, each of said sheets having its respective side edges offset from adjacent sheet side edges;

bonding adjacent face surfaces of such non-solidifed sheets with one another; and cooling the bonded sheets to form a solidified multi-layer composite film.

12. A method of producing a multi-layer flat film comprising;

producing at least two separate melts from independently selected thermo-extrudable materials, each of said melts being at a given independent temperature with a temperature differential between the temperature of each of said melts ranging from about 0° to 200° F.;

co-extruding said melts in the form of flat non-solidified sheets in spaced-apart relatively closely adjacent overlapping position to each other, each of said sheets having its respective side edges offset from adjacent sheet side edges;

bonding adjacent face surfaces of such non-solidified sheets with one another;

cooling the bonded sheets to form a solidified multi-layer composite film; and winding the so-formed and untrimmed multi-layer composite film onto a supply roll thereof, which is characterized by being substantially flat and without wrinkles across the entire width thereof.

* * * * *

PO-1050
(5/69)

UNITED STATES PATENT OFFICE
CERTIFICATE OF CORRECTION

Patent No. 3,865,665     Dated February 11, 1975

Inventor(s) George J. Marion

It is certified that error appears in the above-identified patent and that said Letters Patent are hereby corrected as shown below:

Title page of patent, line 76, applicant's address is - West Chester, Pa. 19380 - .

Signed and sealed this 20th day of May 1975.

(SEAL)
Attest:

RUTH C. MASON
Attesting Officer

C. MARSHALL DANN
Commissioner of Patents
and Trademarks